US012688874B2

(12) United States Patent
Czoschke et al.

(10) Patent No.: US 12,688,874 B2
(45) Date of Patent: Jul. 21, 2026

(54) FERROELECTRIC DATA STORAGE READER

(71) Applicant: Seagate Technology LLC, Fremont, CA (US)

(72) Inventors: Peter Jeremy Czoschke, Bloomington, MN (US); Ali Ghoreyshi, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/077,742

(22) Filed: Mar. 12, 2025

(65) Prior Publication Data

US 2025/0292796 A1 Sep. 18, 2025

Related U.S. Application Data

(60) Provisional application No. 63/565,650, filed on Mar. 15, 2024.

(51) Int. Cl.
*G11B 9/02* (2006.01)

(52) U.S. Cl.
CPC ............ *G11B 9/02* (2013.01); *G11B 2220/23* (2013.01)

(58) Field of Classification Search
CPC ............................... G11B 9/02; G11B 2220/23
See application file for complete search history.

(56) References Cited

U.S. PATENT DOCUMENTS

| | | | |
|---|---|---|---|
| 6,515,957 B1 | 2/2003 | Newns et al. | |
| 7,221,639 B2 | 5/2007 | Onoe et al. | |
| 7,242,661 B2 | 7/2007 | Cho et al. | |
| 7,436,753 B2 | 10/2008 | Mejia et al. | |
| 7,813,254 B2 | 10/2010 | Siegert et al. | |
| 7,916,513 B2 | 3/2011 | Hu et al. | |
| 8,248,906 B2 | 8/2012 | Hong et al. | |
| 2006/0023606 A1* | 2/2006 | Lutwyche ................ | G11B 9/02 369/100 |
| 2007/0196618 A1* | 8/2007 | Nam ..................... G11B 11/007 | |
| 2008/0175133 A1 | 7/2008 | Roelofs et al. | |
| 2008/0180985 A1 | 7/2008 | Kim et al. | |
| 2009/0168238 A1 | 7/2009 | Kim et al. | |

FOREIGN PATENT DOCUMENTS

EP 4020470 A1 6/2022

* cited by examiner

*Primary Examiner* — Andrew Sasinowski
(74) *Attorney, Agent, or Firm* — Mueting Raasch Group

(57) ABSTRACT

Provided are devices and methods for reading data from rotating ferroelectric data storage media using a reader that includes a channel region disposed between a source and a drain. The data bits, stored as dipoles in the ferroelectric media, induce a current flowing through the channel region of the reader from the source to the drain when a bias voltage is applied to the media. The bias voltage can be tuned for desired reader operation, such as enhancing the signal or operating within a linear response regime.

20 Claims, 6 Drawing Sheets

FERROELECTRIC DATA STORAGE READER

RELATED APPLICATION

The present application claims the benefit under 35 U.S.C. § 119(e) of U.S. Provisional Patent Application 63/565,650 filed on Mar. 15, 2024, which is hereby incorporated by reference in its entirety.

TECHNICAL FIELD

The disclosure relates to devices and methods for reading data from rotating ferroelectric data storage media.

SUMMARY

In accordance with certain aspects, the present disclosure provides ferroelectric data storage devices and methods that include rotating media having a ferroelectric layer configured to store bits in first and second dipole states along with a reader including a source, a drain, and a channel that are configured to detect the dipole states stored in the ferroelectric layer based on current flowing through the channel between the source and drain when a bias voltage is applied to the rotating media. In certain aspects, the first dipole state induces current in the reader above a first threshold voltage, the second dipole state induces current in the reader above a second threshold voltage, and the bias voltage is selected to be between the first threshold voltage and the second threshold voltage. For example, the bias voltage may be selected to be about halfway between the first threshold voltage and the second threshold voltage.

In certain aspects, an air bearing separates the reader from the rotating media. In certain aspects, a surface of the reader contacts a surface of the rotating media.

In certain aspects, the reader includes a flux concentrator that extends from the channel toward the rotating media. The flux concentrator may either reduce or expand the area over which electric field flux from the dipole states is collected.

In certain aspects, the reader is configured to enhance a difference in signal between detection of the first dipole state and detection of the second dipole state. In certain aspects, the reader is configured to provide a substantially linear signal response between a first signal threshold for detecting the first dipole state and a second signal threshold for detecting a second dipole state.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
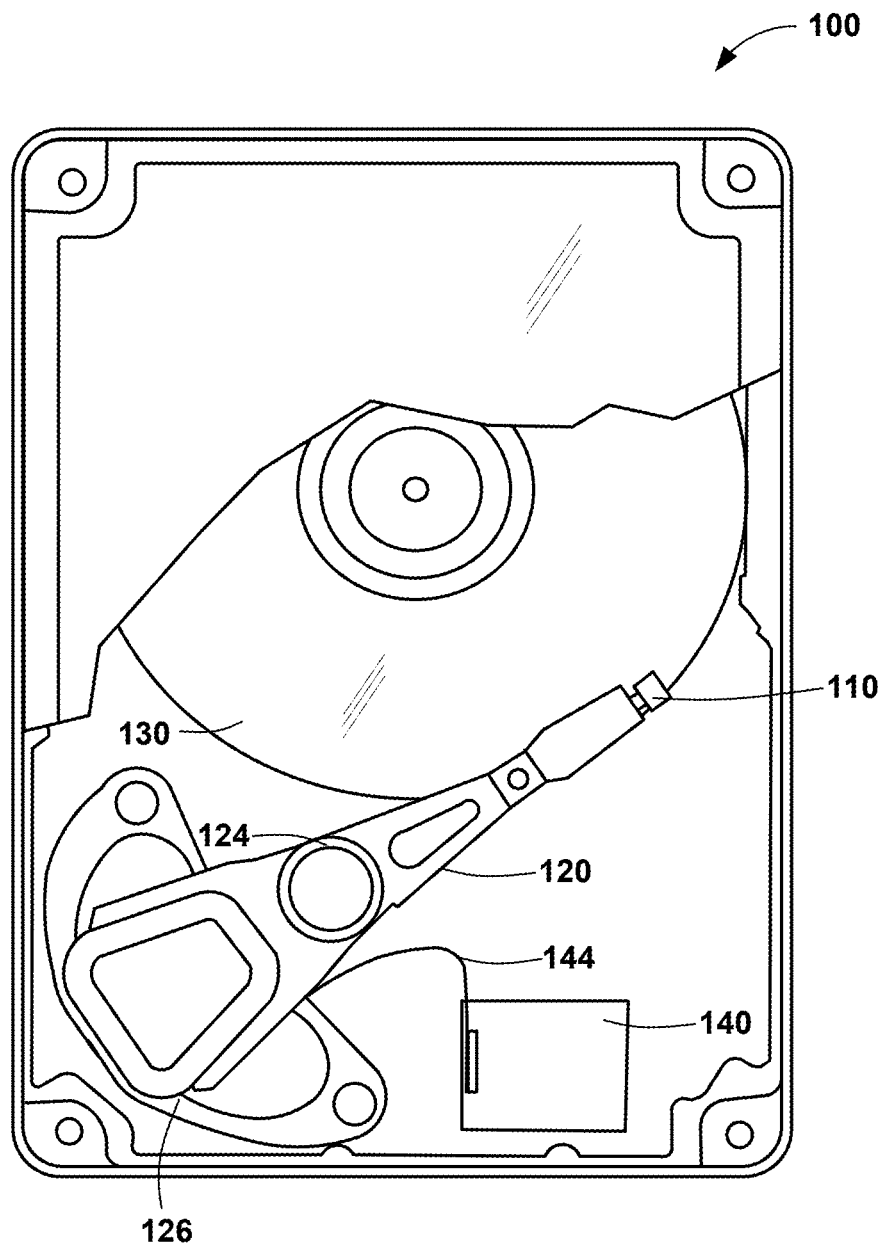
FIG. 1 is a schematic representation of a ferroelectric hard disk drive in accordance with aspects of the present disclosure.

The present disclosure relates to the readback of data stored as dipoles, also referred to herein as polarized domains, in a ferroelectric layer of rotating data storage media. In particular, the present disclosure involves readback of data stored in rotating ferroelectric media using a modified ferroelectric field-effect transistor (FeFET) device. In a rotating ferroelectric storage media environment, the rotating media itself forms the gate portion of the FeFET device, the reader forms the channel, source, and drain of the FeFET device, and the separation between the reader and the rotating ferroelectric media forms the dielectric separating the gate from the channel of the FeFET device. In certain embodiments, the reader is suspended "above" the rotating ferroelectric media, for example on an air bearing. In certain other embodiments, a surface of the reader contacts a surface of the rotating ferroelectric media.

Readback of ferroelectric storage media by the direct measurement of charge at each dipole is difficult because of the small amount of surface charge as well as the small electric fields and their spatial localization. In addition, mechanisms for direct detection of surface charge that involve the use of a probe can be destructive to the data, requiring it to be rewritten, as well as damaging to the surface of the media. In accordance with various aspects of the present disclosure, a readback technique in which the electric field of individual dipoles stored in the ferroelectric layer of a rotating storage medium induces current to flow in the channel region between a source and a drain of a reader in a manner similar to the operation of a FeFET provides both a non-destructive way to read the data and a way to amplify the signal provided from the dipole. Since a FeFET functions both as a switch and as an amplifier, this readback technique results in resolving individual data states of the dipoles as well as amplifying the signal provided by the dipoles, thus producing a higher signal-to-noise ratio (SNR) than for techniques that directly measure the electric field of the dipoles.

In any field-effect transistor (FET), the source-drain current is modulated by a field applied to the channel at the gate. In accordance with various aspects of the present disclosure, the reader serves as the FET channel. When the reader is brought into close proximity with the surface of the media, a source-drain bias applied across the channel produces a current that is modulated by the electric fields from the stored dipoles in the ferroelectric layer of the media. Much like with magnetic storage hard drives, the surface of the reader that is exposed to the media (that is, the media-facing surface) is referred to as the air bearing surface (ABS) because it is separated from the media surface by an air bearing formed by the spinning media. Alternatively, a surface of the reader exposed to the media may contact the media.

In accordance with the present disclosure, a bias voltage is applied to the media substrate to provide an activation voltage for readback operation. The bias voltage applied to the media can be selected to be within a window that provides a desired response between up and down dipole states, thereby controlling the amount and character of the generated signal. For example, the media bias voltage can be controlled so that the FET reader has a source-drain current response that operates in a linear regime and/or that operates in a regime that optimized the amount of signal. As such, controlling the bias voltage can increase SNR as well as enable multi-level storage. Moreover, in addition to or instead of applying a bias voltage to the media, a bias voltage may be applied to the channel of the reader. Without loss of generality, the present disclosure will refer to the bias voltage as being applied to the media, although it will be understood that the bias may be applied to the channel.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements. Likewise, the use of charts is meant to elucidate selected physical and optical behaviors without being bound to exactitude or to any theory.

FIG. 1 schematically depicts an example of a ferroelectric hard drive device 100 that includes a read/write head 110 disposed on the end of an actuator arm 120 that is rotationally movable around a pivot 124 by use of a voice coil motor 126. The read/write head 110 is positioned in close proximity to the surface of ferroelectric media disk 130 such that the read/write head can write and read data bits in the form of dipoles (or polarized domains) in a ferroelectric layer of the media 130 as it spins by action of a spindle motor (not indicated). While the actuator 120 is shown to move rotationally, the present disclosure is not limited in how the actuator moves, and encompasses motion such as linear actuation. Likewise, read/write head 110 can be provided on movable or stationary rails, or in any other suitable manner now known or later contemplated.

Unlike the magnetic media in traditional hard drives, the ferroelectric recording layer in the media of a ferroelectric hard drive such as shown in FIG. 1 does not need to be granular or patterned to facilitate the storage of bits. Polarized domains in a ferroelectric storage medium will remain stable down to whatever size can be practically written. While not the subject of the present disclosure, the writing of a dipole onto rotating ferroelectric storage media involves applying opposite sign potentials to a writer element on the read/write head and to the media. The electric field thus set up in the ferroelectric layer of the media induces a polarization that remains when the electric field is removed, thereby creating a stable dipole that represents a data bit. The writer element may be a probe-like device having a sharp tip that extends to or near the air bearing surface of the read-write head. The size of the probe tip on the writer, the magnitude of the applied potential, the distance between the probe time and the ferroelectric layer, the properties of the ferroelectric layer, and other such factors contribute to the recordable size of the dipoles, and therefore to the recording density. By reversing the polarity of the applied potential, the dipole polarization can be reversed, thereby controlling the data bit state (for example, referred to as up or down, 1 or 0, high or low, etc.).

Figure 2:
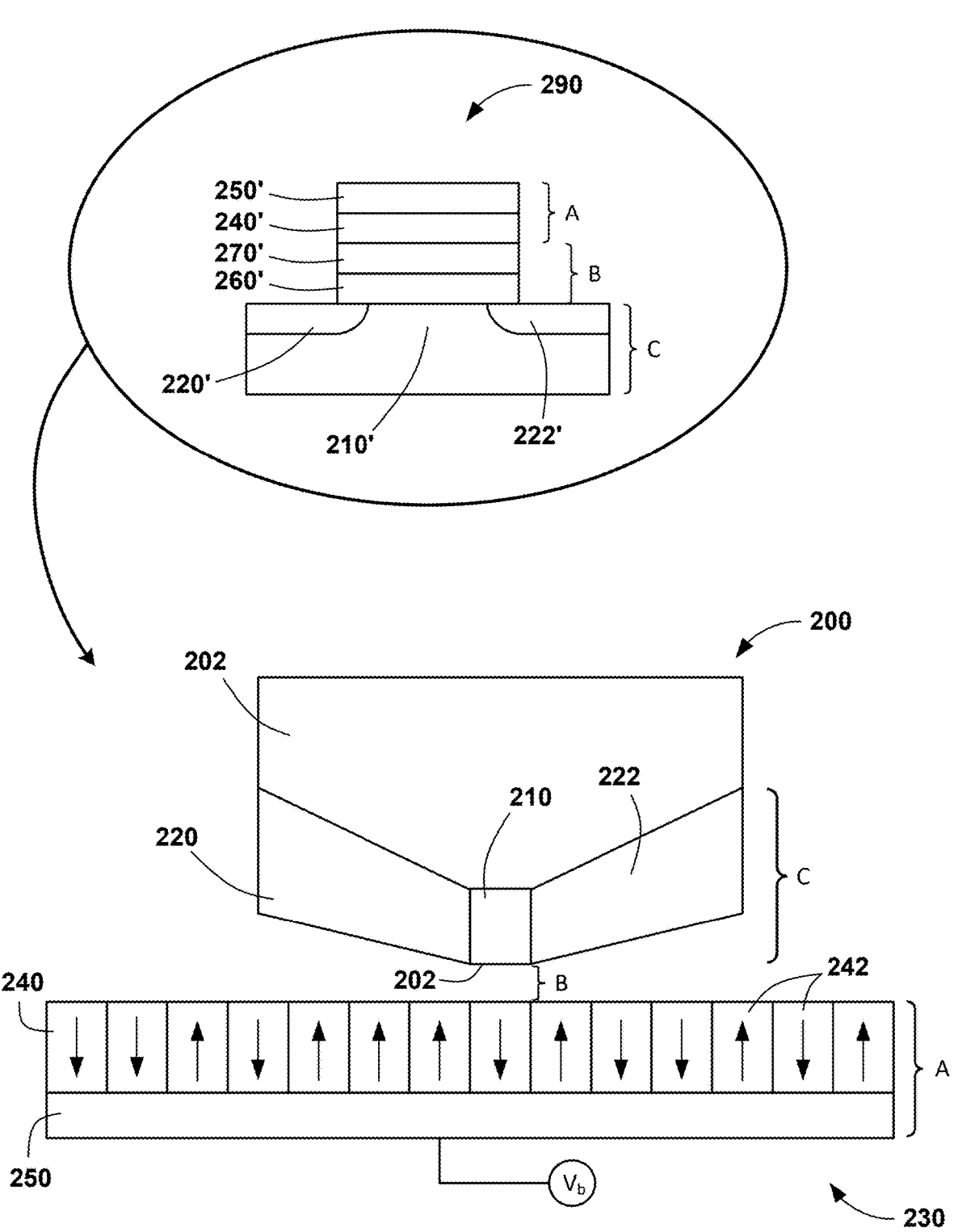
FIG. 2 is a schematic representation of a reader and ferroelectric media in accordance with aspects of the present disclosure.

FIG. 2 schematically shows a FET reader 200 in accordance with various aspects of the present disclosure. Reader 200 includes a reader body 202 on which is provided a channel region 210 disposed between a source 220 and a drain 222. The reader 200 is shown in relation to ferroelectric media 230 that includes a ferroelectric recording layer 240 on a substrate 250. Ferroelectric recording layer 240 is shown to include a plurality of domains 242, each of which is marked by an up or down arrow to indicate a dipole that represents a recorded data state. When the air bearing surface 202 of reader 200 is brought into close proximity to, or in contact with, the adjacent surface of the media 230, the electric field of the dipole of the ferroelectric layer 240 that is directly adjacent to (that is, underneath) the channel region 210 influences the free electron distribution in the channel 210, thereby affecting the ability for current to flow between the source 220 and drain 222 when a bias is applied between them. The amount of current flowing through the channel when the reader senses an up dipole and when the reader senses a down dipole is used to determine the data state. During read operations, a bias voltage $V_b$ is applied to the media 230. Preferably, the size of the channel region 210 is such that the reader is influenced by the electric field from a single recorded dipole.

The combination of reader 200 and media 230 can be compared to the construction of a FeFET 290 shown in the inset in FIG. 2. FeFET 209 includes a gate 250' and ferroelectric layer 240' on top of an optional metal layer 270' and a dielectric layer 260'. These layers are disposed on a substrate in which source 220' and drain 222' regions are formed such that a channel region 210' is disposed therebetween and directly under the gate stack. Under the influence of an electric field produced by the gate stack, the conductivity of the channel region 210' between the source 220' and the drain 222' is altered so that a current can flow when a bias is applied between the source and the drain. The structure and operation of a FeFET are well-known, and need not be fully recounted in this document. Nonetheless, it is instructive to correlate elements of FeFET 290 with the reader 200 and media 230. The gate 250' and ferroelectric layer 240' of FeFET 290 can be correlated to the media substrate 250 and ferroelectric layer 240 of media 230, as indicated by A in FIG. 2. The channel 210', source 220', and drain 222' of FeFET 290 can be correlated to the channel 210, source 220, and drain 222 of reader 200, as indicated by C in FIG. 2. And the metal layer 270' and dielectric layer 260' can be correlated to the separation between the reader 200 and the media 230, as indicated by B in FIG. 2, which may be, for example, an air gap or a dielectric layer on the reader and/or on the media surface. In this way, devices in accordance with the present disclosure can be visualized as conventional FeFET constructions that have been inverted.

As will be appreciated, ferroelectric storage readers in accordance with the present disclosure can be constructed in any suitable manner such as the fabrication techniques used to make traditional FeFET devices for solid state storage or other applications. As will further be appreciated, various elements can be included that are not indicated in FIG. 2, such as differential sensors, shields, protective layers, passivation layers, and so forth. Moreover, while the source-drain bias in FIG. 2 is indicated to be in a down-track direction (that is, parallel to the direction of media movement with respect to the reader), any alignment of the source-drain bias relative to the media movement or the data storage tracks may be used. Also, while the reader 200 is shown to include a single source-channel-drain sensor, readers having multiple sensors that have the same or different bias directions may be constructed. Although not indicated in FIG. 2, in any of these constructions an electrode may be included to apply a bias voltage to channel 210. Biasing the channel can be done instead of or in addition to biasing the media, and may provide an additional level of control in adjusting the reader sensitivity.

Figure 3A:
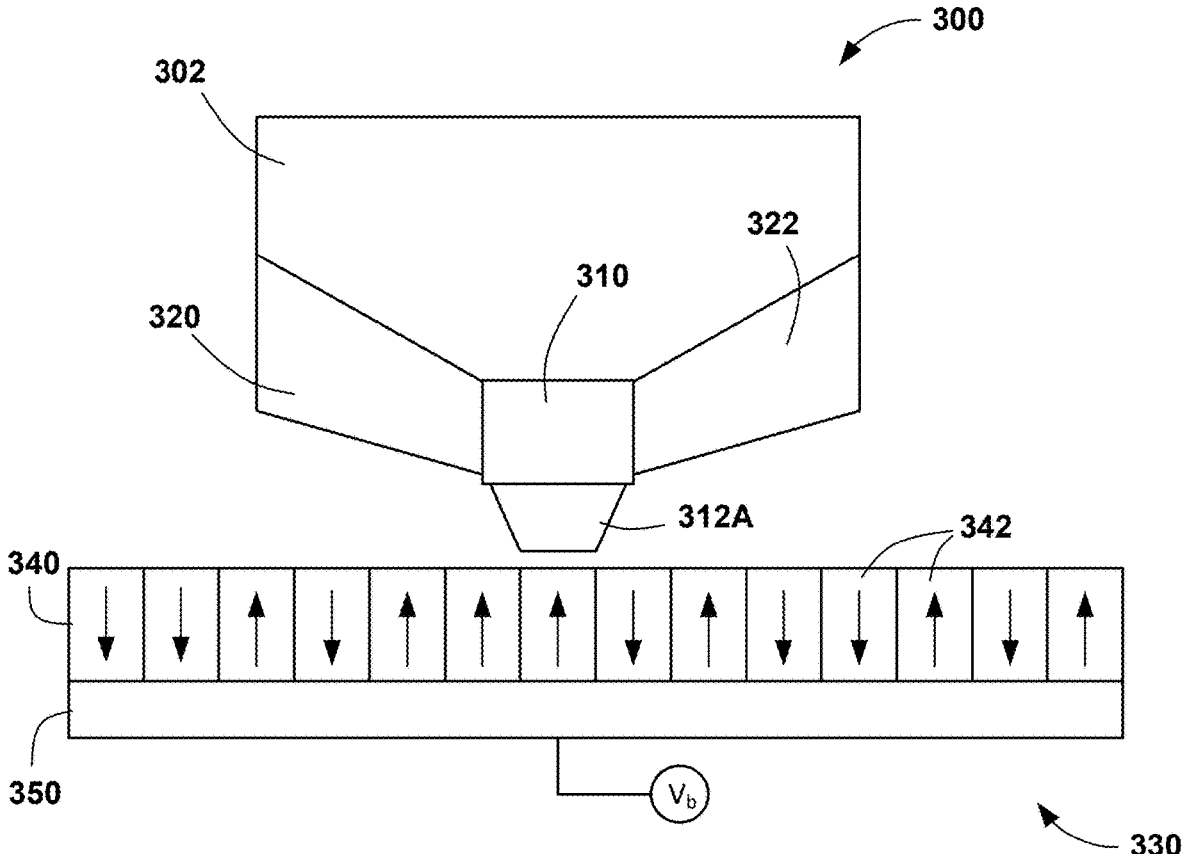
FIG. 3A is a schematic representation of a reader and ferroelectric media in accordance with aspects of the present disclosure.

FIG. 3A schematically show a FET reader 300 similar to that shown in FIG. 2, but with the addition of a narrowing flux concentrator 312A. Reader 300 includes a reader body 302 on which is provided a channel region 310 disposed between a source 320 and a drain 322. Flux concentrator 312A is disposed on channel region 310 such that the flux concentrator 312A presents a surface adjacent to the media 330. The reader 300 is shown in relation to ferroelectric media 330 that includes a ferroelectric recording layer 340 on a substrate 350. Ferroelectric recording layer 340 is shown to include a plurality of domains 342, each of which is marked by an up or down arrow to indicate a dipole that represents a recorded data state. When the reader 300 is brought in close proximity to the media 330, the electric field of the dipole of the ferroelectric layer 340 that is directly adjacent to the flux concentrator 312A is "collected" by the flux concentrator 312A, which in turn influences the free electron distribution in the channel 310 so that the data state of the dipole can be determined. During read operations, a bias voltage $V_b$ is applied to the media 330.

As shown, the flux concentrator 312A tapers such that it is narrower near the media 330. Such a construction can be used when the size of the channel region 310 is larger than the size of the polarization domains 342. In this way, the use of a narrowing flux concentrator 312A limits the sensed electric field so that the data states of single polarization domains can be resolved. When implementing such a construction, care should be taken so that the flux concentrator 312A does not create a shunt between the source 320 and the drain 322.

Figure 3B:
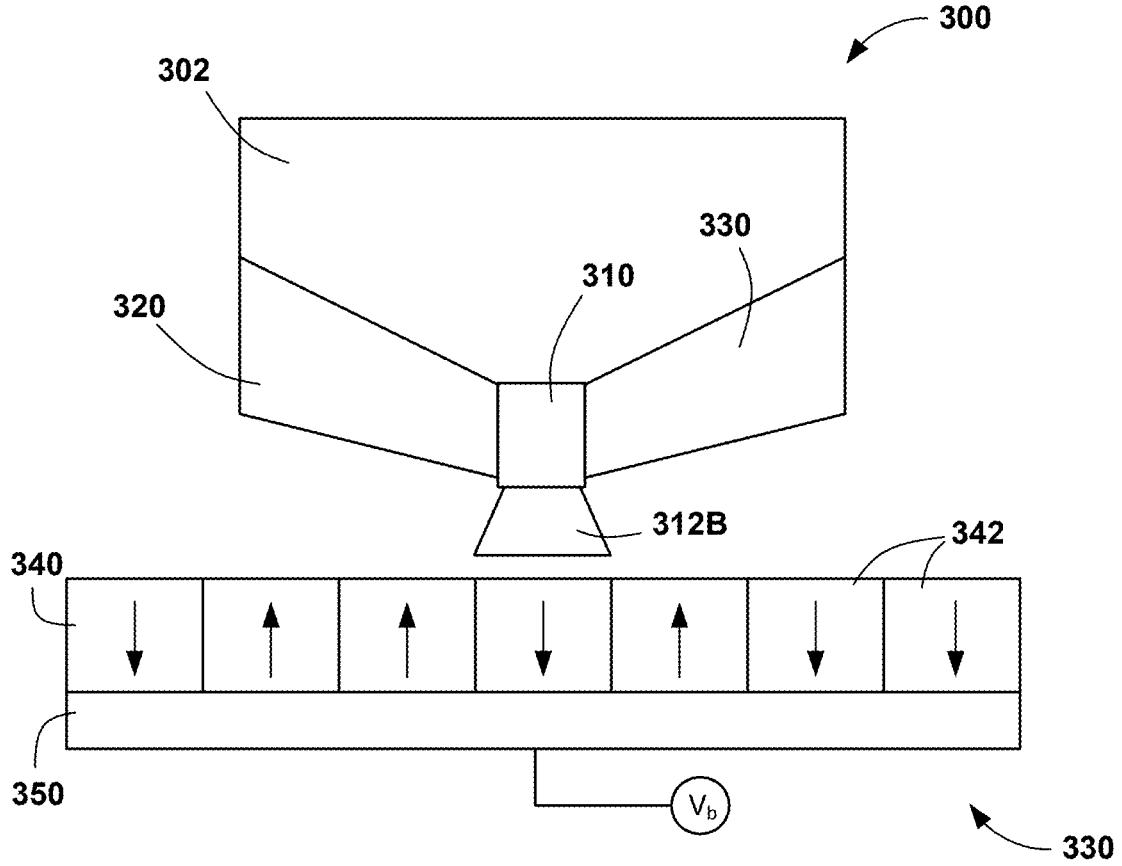
FIG. 3B is a schematic representation of a reader and ferroelectric media in accordance with aspects of the present disclosure.

FIG. 3B schematically show a FET reader 300 similar to that shown in FIG. 2, but with the addition of a widening flux concentrator 312B. Reader 300 includes a reader body 302 on which is provided a channel region 310 disposed between a source 320 and a drain 322. Flux concentrator 312B is disposed on channel region 310 such that the flux concentrator 312B presents a surface adjacent to the media 330. The reader 300 is shown in relation to ferroelectric media 330 that includes a ferroelectric recording layer 340 on a substrate 350. Ferroelectric recording layer 340 is shown to include a plurality of domains 342, each of which is marked by an up or down arrow to indicate a dipole that represents a recorded data state. When the reader 300 is brought in close proximity to the media 330, the electric field of the dipole of the ferroelectric layer 340 that is directly adjacent to the flux concentrator 312B is "collected" by the flux concentrator 312B, which in turn influences the free electron distribution in the channel 310 so that the data state of the dipole can be determined. During read operations, a bias voltage $V_b$ is applied to the media 330.

As shown, the flux concentrator 312B tapers such that it is narrower near the channel region 310. Such a construction can be used when the size of the channel region 310 is smaller than the size of the polarization domains 342. In this way, the use of a widening flux concentrator 312B gathers additional electric field flux than would be sensed without the use of the widening flux concentrator 312B, thereby increasing the amount of signal. When implementing such a construction, care should be taken so that the flux concentrator 312A does not create a shunt between the source 320 and the drain 322.

Figure 4A:
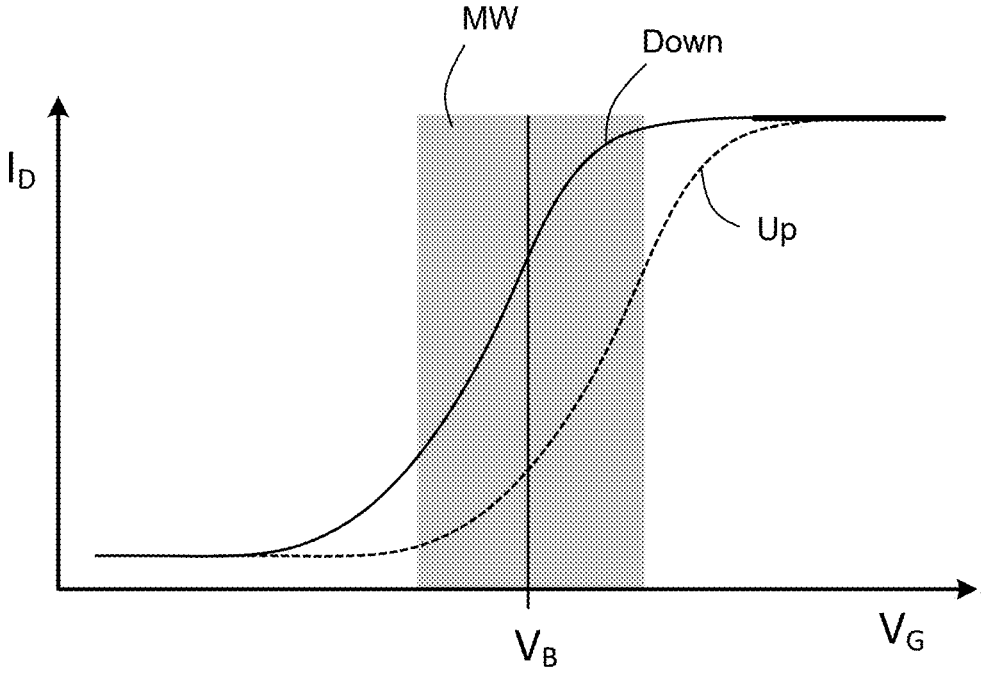
FIG. 4A is a chart schematically indicating current versus voltage response curves for up and down data states recorded in ferroelectric media.

FIG. 4A illustrates the current ($I_D$) versus the gate voltage ($V_G$) for a current flowing through the channel of a FET reader in accordance with the present disclosure and as measured at the drain of the reader. The gate voltage is the voltage provided by the media, both from the bias voltage ($V_B$) applied to the media and the contribution of the electric field from the recorded up and down bits in the ferroelectric media. The gap between the curves for the up bits and the down bits defines a memory window (MW), which spans the current versus voltage space over which there is a significant enough difference between the current measured in the reader for up bits and down bits so that the states can be determined. As such, the memory window defines the range of gate voltages between a first threshold, above which a first data state can be determined, and a second threshold, below which a second data state can be determined, in which sufficient signal can be gathered to distinguish between the first and second memory states. The performance of readers as described in the present disclosure is enhanced when the media bias voltage is within the memory window, and preferably close to the center of the memory window.

Figure 4B:
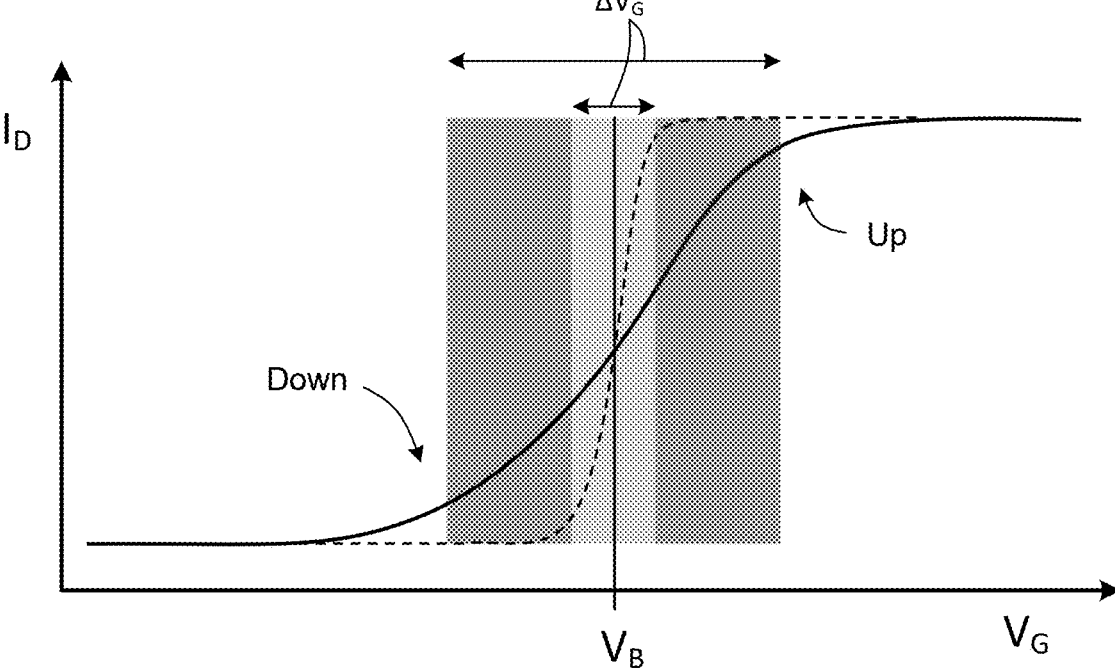
FIG. 4B is a chart schematically indicating current versus voltage response curves for a reader channel having a steep transition versus a shallow transition for up and down states recorded in ferroelectric media.

FIG. 4B illustrates the current ($I_D$) versus gate voltage ($V_G$) behavior for two different readers, one represented by the solid curve and the other represented by the dashed curve. Depending on the properties of the reader such as the doping levels of the source and drain, the material and doping of the channel region, the lengths and width of the channel region, and so forth, the slope of the current versus gate voltage curve can be altered, thus affecting the abruptness of the transition between up and down states, as well as the linearity of the change during the transition. How to adjust this behavior using the properties of the source, drain, and channel is well understood by those skilled in the art of designing FeFET transistors. The difference in gate voltage ($\Delta V_G$) between the up and down states is much narrower for the steeper, dashed curve, which produces a sharper and more abrupt transition between states, which may provide a better signal-to-noise ratio. The difference in gate voltage ($\Delta V_G$) between the up and down states for the solid line curve is wider due to the more gradual transition between states. Such a gradual transition provides a region of substantially linear behavior, which may be beneficial in multilevel recording where data states are defined between the up and down states. For example, four-level recording techniques can be employed where the first data state produces near 0 current, the second produces a low current, the third produces a higher but less than saturated current, and the fourth produces a saturated current. Whether the device produces a sharp or gradual transition, the media bias voltage ($V_B$) may be selected to lie in the center of the transition.

Figure 5:
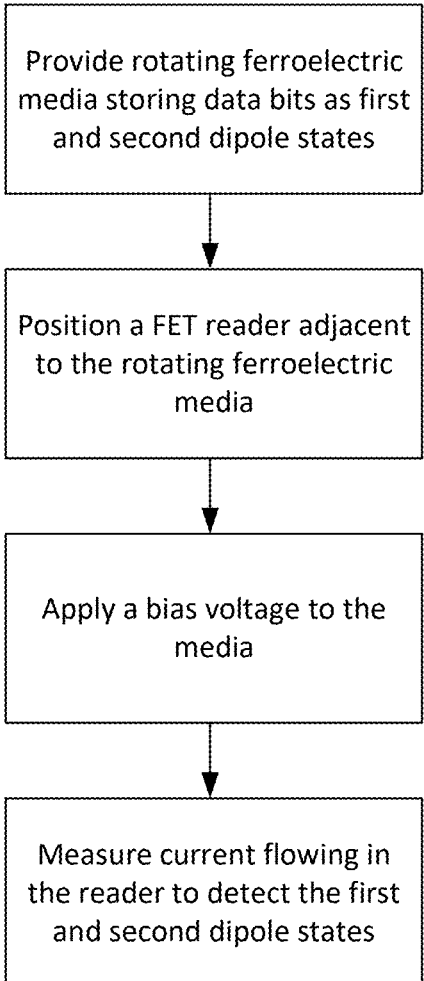
FIG. 5 is a flow chart depicting steps for use with methods of reading data stored on ferroelectric media in accordance with aspects of the present disclosure.

FIG. 5 shows a flow chart including steps that may be performed in methods of using a FET reader to detect data bits stored in rotating ferroelectric media in accordance with the present disclosure. A FET reader is positioned adjacent to the rotating ferroelectric media, which stores data bits in a ferroelectric layer as first and second dipole states. Upon applying a bias voltage to the media (or, equivalently, to the channel portion of the FET reader), the current measured at the reader and as induced by the electric field of the dipole states allows the data bits to be discerned.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A data storage device comprising:
   rotating media having a ferroelectric layer configured to store bits in first and second dipole states; and
   a reader adjacent to the rotating media, the reader comprising a source, a drain, and a channel configured to detect the dipole states stored in the ferroelectric layer based on current flowing through the channel between the source and drain when a bias voltage is applied to the rotating media, the reader being configured to provide a substantially linear signal response between a first signal threshold for detecting the first dipole state and a second signal threshold for detecting a second dipole state.

2. The data storage device of claim 1, wherein the first dipole state induces current in the reader above a first threshold voltage, the second dipole state induces current in the reader above a second threshold voltage, and the bias voltage is selected to be between the first threshold voltage and the second threshold voltage.

3. The data storage device of claim 2, wherein the bias voltage is selected to be about halfway between the first threshold voltage and the second threshold voltage.

4. The data storage device of claim 1, wherein an air bearing separates the reader from the rotating media.

5. The data storage device of claim 1, wherein a surface of the reader contacts a surface of the rotating media.

6. The data storage device of claim 1, wherein the reader includes a flux concentrator that extends from the channel toward the rotating media.

7. The data storage device of claim 6, wherein the flux concentrator reduces an area over which electric field flux from the dipole states is collected.

8. The data storage device of claim 6, wherein the flux concentrator expands an area over which electric field flux from the dipole states is collected.

9. The data storage device of claim 1, wherein the reader is configured to enhance a difference in signal between detection of the first dipole state and detection of the second dipole state.

10. A method for use with a ferroelectric data storage device that comprises a rotating media having a ferroelectric layer storing data bits in first and second dipole states, comprising the steps of:
    applying a bias voltage to the rotating media;
    positioning a reader adjacent to the rotating media to thereby induce a current to flow through a channel region of the reader disposed between a source and a drain; and
    measuring the induced current to thereby detect the first and second dipole states, wherein the reader is configured to provide a substantially linear signal response between a first signal threshold for detecting the first dipole state and a second signal threshold for detecting a second dipole state.

11. The method of claim 10, wherein the bias voltage is selected to be between a first threshold voltage for inducing current flowing through the channel region based on the first dipole state and a second threshold voltage for inducing current flowing through the channel region based on the second dipole state.

12. The method of claim 11, wherein the bias voltage is selected to be about halfway between the first threshold voltage and the second threshold voltage.

13. The method of claim 10, wherein positioning the reader adjacent to the rotating media comprises floating the reader on an air bearing that separates the reader from the rotating media.

14. The method of claim 10, wherein positioning the reader adjacent to the rotating media comprises brining the reader into contact with the rotating media.

15. The method of claim 10, wherein the reader includes a flux concentrator that extends from the channel toward the rotating media, and wherein positioning the reader adjacent to the rotating media comprises positioning a surface of the flux concentrator adjacent to the rotating media.

16. The method of claim 15, wherein the flux concentrator reduces an area over which the reader collects electric field flux from the dipole states.

17. The method of claim 15, wherein the flux concentrator expands an area over which the reader collects electric field flux from the dipole states.

18. The method of claim 10, wherein the reader is configured to enhance a difference in signal between detection of the first dipole state and detection of the second dipole state.

19. A data storage device comprising:

rotating media having a ferroelectric layer configured to store bits in first and second dipole states; and a reader adjacent to the rotating media, the reader comprising a source, a drain, and a channel configured to detect the dipole states stored in the ferroelectric layer based on current flowing through the channel between the source and drain when a bias voltage is applied to the rotating media, wherein the first dipole state induces current in the reader above a first threshold voltage, the second dipole state induces current in the reader above a second threshold voltage, and the bias voltage is selected to be between the first threshold voltage and the second threshold voltage.

20. The data storage device of claim 19, wherein the bias voltage is selected to be about halfway between the first threshold voltage and the second threshold voltage.

* * * * *